(12) United States Patent
Appriou et al.

(10) Patent No.: US 7,629,032 B2
(45) Date of Patent: Dec. 8, 2009

(54) METHOD FOR BUILDING UP PLASMA ON AN OPTICAL FIBER PREFORM, WHILE REDUCING NITROGEN OXIDES

(75) Inventors: André Appriou, Cremieu (FR); Charles Truchot, Lille (FR); Sabine Guina, Quentin (FR)

(73) Assignee: Draka Comteq B.V., Amsterdam (NL)

( * ) Notice: Subject to any disclaimer, the term of this patent is extended or adjusted under 35 U.S.C. 154(b) by 954 days.

(21) Appl. No.: 10/725,003

(22) Filed: Dec. 2, 2003

(65) Prior Publication Data
US 2004/0107898 A1  Jun. 10, 2004

(30) Foreign Application Priority Data
Dec. 2, 2002  (FR)  .................. 02 15124

(51) Int. Cl.
 *H05H 1/26* (2006.01)
(52) U.S. Cl. .............. 427/569; 427/576; 427/578; 427/579; 427/163.2; 427/167; 65/391; 65/414
(58) Field of Classification Search ............. 427/569, 427/576, 578, 579, 163.2, 167; 65/391, 414
See application file for complete search history.

(56) References Cited

U.S. PATENT DOCUMENTS

| | | | | |
|---|---|---|---|---|
| 3,642,453 A * | 2/1972 | Chilton et al. | ............ | 23/294 R |
| 4,402,720 A * | 9/1983 | Edahiro et al. | ............ | 65/391 |
| 4,689,212 A * | 8/1987 | Mansfield | ............ | 427/452 |
| 4,924,061 A * | 5/1990 | Labat et al. | ............ | 219/121.52 |
| 5,154,745 A * | 10/1992 | Le Sergent | ............ | 65/391 |
| 5,174,982 A * | 12/1992 | Dosaj et al. | ............ | 423/350 |
| 5,522,007 A * | 5/1996 | Drouart et al. | ............ | 385/141 |
| 6,109,065 A * | 8/2000 | Atkins et al. | ............ | 65/399 |
| 7,469,559 B2 * | 12/2008 | Ball et al. | ............ | 65/397 |
| 2003/0017262 A1 * | 1/2003 | Oh et al. | ............ | 427/162 |

FOREIGN PATENT DOCUMENTS

EP  0 401 742 A1  12/1990
GB  2 134 896 A  8/1984

OTHER PUBLICATIONS

Patent Abstracts of Japan, vol. 1995, No. 02, Mar. 31, 1995 corresponding to JP 06 321552 A (Fujikura Ltd.) dated Nov. 22, 1994.

* cited by examiner

*Primary Examiner*—Bret Chen
(74) *Attorney, Agent, or Firm*—Sughrue Mion, PLLC

(57) ABSTRACT

A plasma buildup method for building up an optical fiber perform. The method includes the steps of: providing a plasma torch having an outlet nozzle adjacent to a primary perform, wherein an interaction zone is defined between the outlet nozzle and the primary preform; feeding the plasma torch with a plasma-generating gas in the presence of a silica-based material so as to deposit a buildup material on the primary preform; and introducing a reducing element into the interaction zone, the reducing element reacting to induce reduction of the nitrogen oxides produced by interaction between nitrogen and oxygen in the presence of the plasma generated by the torch.

10 Claims, 3 Drawing Sheets

METHOD FOR BUILDING UP PLASMA ON AN OPTICAL FIBER PREFORM, WHILE REDUCING NITROGEN OXIDES

BACKGROUND OF THE INVENTION

The invention relates to the field of optical fibers, and more precisely to the fabrication of optical fibers by depositing a buildup material on a preform by means of a plasma torch.

Plasma buildup of a "primary" optical fiber preform is a technique that serves to increase the diameter of the preform considerably, and consequently to enable optical fibers of greater length to be drawn. This technique is described in particular in documents EP 0 401 742, EP 0 450 465, and EP 0 658 520.

Because of the high temperatures generated by the plasma produced by the plasma torch, interaction between the nitrogen and the oxygen contained in the confined enclosure where buildup is performed generates nitrogen oxides ($NO_x$).

These nitrogen oxides are exhausted from the enclosure and collected by a processing installation for restricting rejection to the atmosphere in compliance with antipollution standards. Such processing installations generally make use of a depollution method referred to as selective catalytic reduction (SCR) which consists in heating the residual gases to a temperature lying in the range 300° C. to 400° C. and in making them react with a reducing gas in the presence of a catalyst. Such an installation is expensive both in terms of its own manufacture and installation, and in terms of its running costs. In addition, that type of installation is relatively bulky. Furthermore, heating the residual gases by means of natural gas gives rise to a large discharge of carbon dioxide gas. Finally, the residual gases for processing generally contain very fine particles of silica, typically of submicron size, and these can lead to premature wear of the catalyst, and consequently to a significant extra amount of operating cost.

An object of the invention is thus to improve the situation.

SUMMARY OF THE INVENTION

To this end, the invention provides a plasma buildup method for an optical fiber preform, in which, firstly, a buildup material is deposited on a primary preform for building up by means of a plasma torch fed with plasma-generating gas and in the presence of a silica-based material (of the $SiO_2$ type), and secondly at least one reducing element is introduced upstream from the primary preform, the element reacting to induce reduction of the nitrogen oxides produced by the interaction between the nitrogen and oxygen (contained in the enclosure) in the presence of the plasma generated by the torch.

As a result, the quantity of nitrogen oxides collected at the outlet from the confined enclosure is significantly reduced, thus making it possible to use processing installations of reduced capacity, or even to do without such an installation altogether, depending on the environmental standards in force.

Preferably, each reducing element is introduced in the gaseous state. However it is also possible to introduce one or more reducing elements in the solid state. It is also possible to introduce one or more reducing elements in the gaseous state and one or more reducing elements in the solid state. A reducing element in the solid state is introduced downstream from the plasma torch (or at the periphery of its end) and upstream from the preform.

Each gaseous reducing element is preferably selected from: hydrogen; ammonia; carbon monoxide; and light hydrocarbons, in particular methane, ethane, propane, and butane. Furthermore, each solid reducing element is preferably selected from: urea, and ammonium fluoride, and derivatives thereof containing bonds suitable for oxidizing easily. In general, it is possible to use any solid, liquid, or gaseous element providing decomposition thereof due to the high temperatures of the plasma is suitable for releasing the reducing effect of the element, such as for example hydrogen.

In addition, when a gaseous reducing element is used, it may also constitute at least a portion of the plasma-generating gas, naturally providing it is introduced upstream from the plasma torch.

The reducing element(s) may be introduced in a very wide variety of sites. Thus, at least one of the reducing elements may be introduced in the plasma torch, upstream from its outlet nozzle, such as, for example, in the central zone where the plasma-generating gas flows, optionally substantially simultaneously therewith, and/or at the periphery of said central zone. In a variant, or in addition, at least one of the reducing elements may be introduced into the plasma torch at an end of its outlet nozzle, such as, for example, in at least one location on its periphery. Also in a variant or in addition, at least one of the reducing elements may be introduced at at least one location of an interaction zone lying between the outlet nozzle and the primary preform.

The invention also provides apparatus for plasma buildup of an optical fiber preform, the apparatus comprising firstly a plasma torch fed with plasma-generating gas by primary feed means and arranged in such a manner as to enable a buildup material to be deposited on a primary preform for building up in the presence of a silica-based material (of the $SiO_2$ type), and secondly secondary feed means arranged in such a manner as to introduce at least one reducing element upstream from the primary preform, the reducing element reacting to induce reduction of the nitrogen oxides produced by the interaction between nitrogen and oxygen (contained in the enclosure) in the presence of the plasma generated by the torch.

The apparatus of the invention may include additional characteristics which may be taken separately or in combination, and in particular:

secondary feed means coupled to the plasma torch and arranged in such a manner as to introduce at least one of the reducing elements into the inside of the plasma torch upstream from an outlet nozzle, such as, for example, in a central zone in which the plasma-generating gas circulates and/or at the periphery of said central zone;

secondary feed means coupled to the plasma torch and arranged in such a manner as to introduce at least one of the reducing elements at an end of the outlet nozzle of the plasma torch, such as, for example, at at least one location at the periphery of the end of said outlet nozzle; and secondary feed means coupled to the plasma torch and arranged in such a manner as to introduce at least one of the reducing elements at at least one location in an interaction zone extending between the outlet nozzle of the plasma torch and the primary preform.

BRIEF DESCRIPTION OF THE DRAWINGS

Other characteristics and advantages of the invention appear on examining the following detailed description and the accompanying drawings, in which.

DETAILED DESCRIPTION OF THE INVENTION

These drawings may serve not only to contribute to describing the invention, but may also contribute to defining it, where appropriate.

The apparatus of the invention is dedicated to plasma buildup of an optical fiber preform. It constitutes part of a plasma buildup installation of the type described in detail in documents EP 0 401 742, EP 0 450 465, and EP 0 658 520, in particular.

In general, such an installation comprises firstly a device for feeding a silica-based material, such as grains of silica ($SiO_2$) possibly mixed with sulfur hexafluoride, for example, in order to purify them, and secondly a confined enclosure in which there is housed at least a portion of the plasma buildup apparatus and a device for supporting and moving a mandrel constituting the "primary" preform that is to be built up, and into which there opens out an injector for injecting silica-based material from the feed device. Below, in order to simplify the description, it is assumed that the silica-based material is constituted by grains of silica ($SiO_2$).

Figure 1:
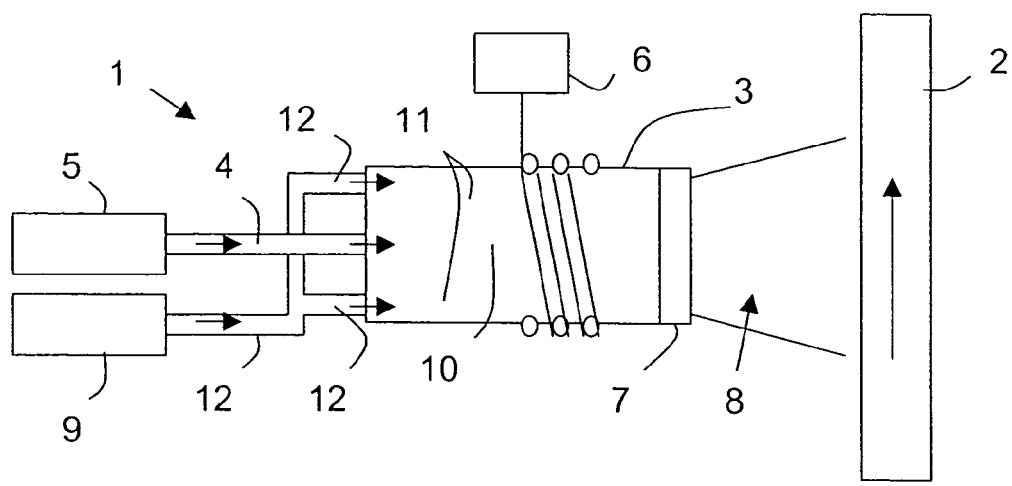
FIG. 1 is a diagram of a first embodiment of apparatus of the invention.
Figure 2:
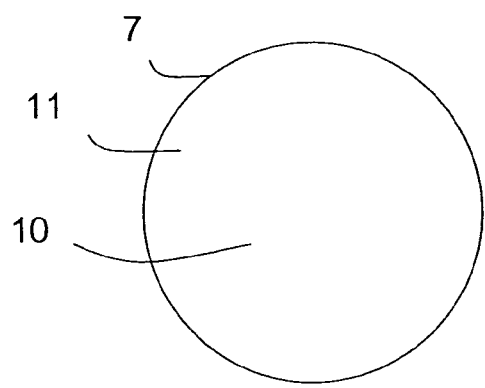
FIG. 2 is a plan view of the end of the outlet nozzle of the plasma torch in the apparatus of FIG. 1.

Reference is made initially to FIGS. 1 and 2 to describe a first embodiment of apparatus of the invention.

The plasma buildup apparatus 1 comprises a plasma torch 3 coupled by a pipe 4 to a feed module 5 for feeding a plasma-generating gas such as oxygen, nitrogen, or argon, or a combination of two of them, and surrounded by a coil fed with high frequency current by a generator 6.

Usually, the plasma-generating gas injected into the plasma torch 3 is a mixture of nitrogen and oxygen. In addition, although not always shown in the figures, a fraction of the plasma-generating gas is generally introduced into a central portion 10 of the plasma torch, while the remainder is introduced at a different rate into the periphery 11 around the central portion 10. It is important to observe that there is no partition separating the central and peripheral portions 10 and 11.

A plasma of ionized gas at high temperature is generated inside the plasma torch 3 and is delivered at the end of an outlet nozzle 7 of said torch. The injector of $SiO_2$ grains (not shown) delivers its grains into an interaction zone 8 situated between the outlet nozzle 7 and the preform-mandrel 2 which moves in translation and in rotation in controlled manner under drive from a support and displacement device (not shown). Under the action of the heat given off by the plasma leaving the torch 3, the grains of $SiO_2$ sublime and become stuck to the preform-mandrel 2 which can thus be built up in silica.

In the invention, the buildup apparatus 1 further comprises at least one module 9 for feeding one or more reducing elements. In this embodiment, the feed module 5 supplies plasma-generating gas (preferably air and essentially containing nitrogen and oxygen in selected proportions) to the central and peripheral zones 10 and 11 of the plasma torch 3 via the pipe 4, while the feed module 9 feeds the peripheral zone 11 with one or more reducing elements via pipes 12.

In this embodiment, the reducing element and the plasma-generating gas are mixed together inside the plasma torch 3.

In order to enable the reduction reaction to take place, it is possible to use any solid, liquid, or gaseous element which, on decomposing due to the high temperatures of the plasma, serves to release the reducing effect of elements such as, for example, hydrogen.

Nevertheless, each reducing element is preferably introduced in the gaseous state. But in other embodiments, it is possible to envisage introducing one or more reducing elements in the solid state, or one or more reducing elements in the gaseous state together with one or more reducing elements in the solid state. It is important to observe that a reducing element in the solid state may be introduced downstream from the plasma torch 3 (or at the periphery of its outlet nozzle 7), and upstream from the preform-mandrel 2.

Each gaseous reducing element is preferably selected from: hydrogen ($H_2$); ammonia ($NH_3$); carbon monoxide (CO); and light hydrocarbons, in particular methane ($CH_4$), ethane ($C_2H_6$), propane ($C_3H_8$), and butane ($C_4H_{10}$). Each solid reducing element is preferably selected from urea, ammonium fluoride ($NH_4F$), and derivatives thereof containing bonds suitable for oxidizing easily.

In this first embodiment, a mixture of hydrogen, air, and ammonia is introduced into the peripheral zone 11 of the plasma torch 3. However, it would be possible to introduce hydrogen only or ammonia and air only, or any other reducing element on its own or in combination.

The nitrogen oxides generated by interaction between the oxygen and the nitrogen contained in the enclosure due to the high temperatures of the plasma generated by the torch 3 are reduced by the reducing elements that are introduced into the buildup apparatus 1 upstream from the outlet of the confined enclosure, in accordance with one or other of the chemical formulae given below:

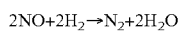

$$2NO+2H_2 \rightarrow N_2+2H_2O$$

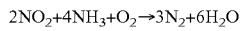

$$2NO_2+4NH_3+O_2 \rightarrow 3N_2+6H_2O$$

Figure 3:
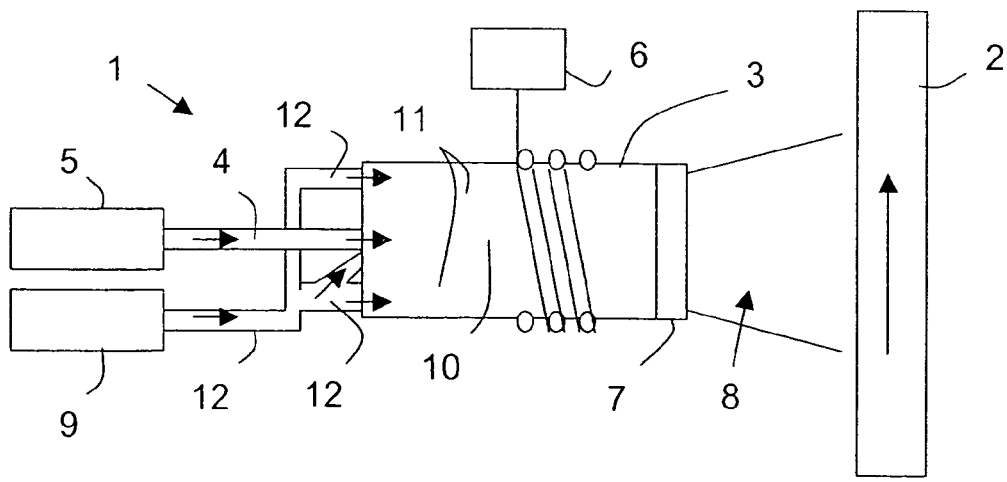
FIG. 3 is a diagram of a second embodiment of apparatus of the invention.

Reference is now made to FIG. 3 to describe a second embodiment of apparatus of the invention. This embodiment constitutes a variant of the apparatus described above described with reference to FIGS. 1 and 2.

In this example, the feed module 9 feeds one or more reducing elements, preferably accompanied by air, via pipes 12, not only to the peripheral zone 11, but also to the central zone 10. In a variant that is not shown, it is also possible to envisage the feed module 9 comprising two independent subportions respectively feeding the central and peripheral zones 10 and 11 of the plasma torch 3 with different reducing elements (preferably accompanied by air).

Figure 4:
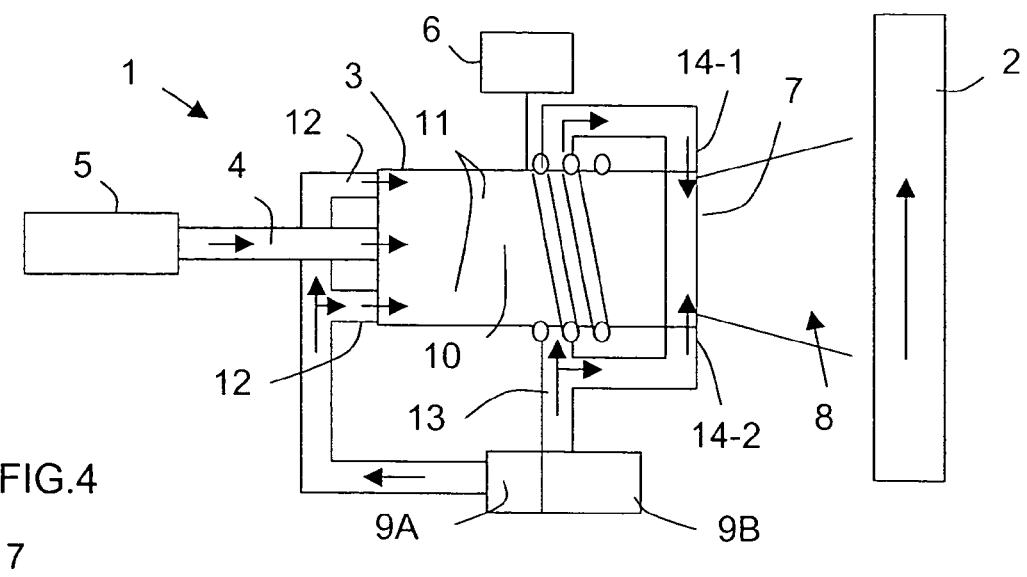
FIG. 4 is a diagram of a third embodiment of apparatus of the invention.
Figure 5:
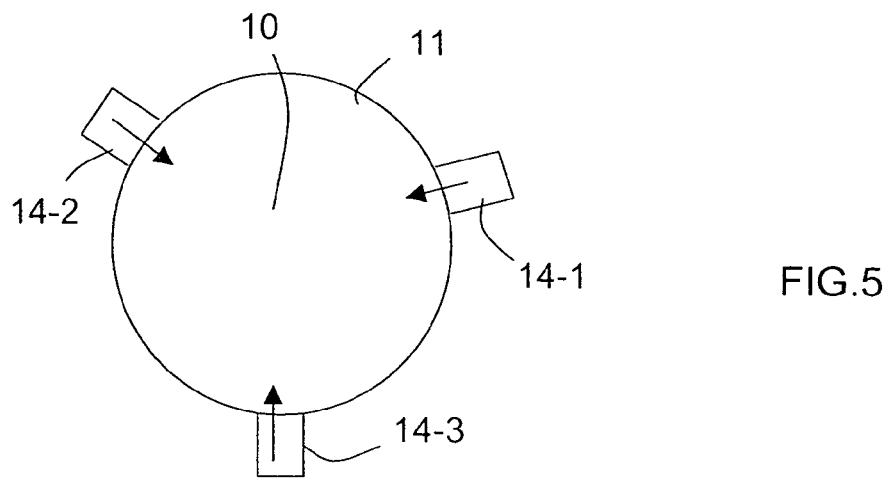
FIG. 5 is a plan view of an embodiment of the end of the outlet nozzle for the plasma torch of the apparatus of FIGS. 4, 6, and 7.

Reference is now made to FIGS. 4 and 5 while describing a third embodiment of apparatus of the invention. This apparatus constitutes a second variant of the apparatus described above with reference to FIGS. 1 and 2.

In this example, the feed module 9 is subdivided into at least two submodules 9A and 9B which feed preferably different reducing elements not only to the upstream portion of the plasma torch 3 via pipes 12, but also to the downstream portion of the torch at the end of its outlet nozzle 7 via pipes 13. The end of the outlet nozzle 7 has at least one inlet 14 connected to a pipe 13 and arranged to deliver one or more reducing elements to the outlet of the plasma torch 7 at at least one location. For example, the upstream portion of the plasma torch 3 is fed with air and hydrogen by the feed submodule 9A via the pipe 12, while the inlets 14 of the outlet nozzle 7 are fed with ammonia ($NH_3$) by the feed submodule 9B via the pipes 13.

As shown in FIG. 5, three inlets 14-1 to 14-3 are provided in this case to introduce the reducing element(s) at at least three locations, e.g. in such a manner as to generate a curtain of one or more reducing elements through which the plasma passes. However, it would naturally be possible to provide two inlets or four or even more inlets. The outlet nozzle 7 could also be fitted with a multitude of holes allowing reducing elements to be diffused and distributed uniformly at the outlet end of the plasma torch 3.

Instead of starting from the FIG. 1 buildup apparatus having means added thereto for feeding its outlet nozzle 7 with one or more reducing elements, it would naturally be possible to start from the buildup apparatus of FIG. 3 and provide it with means for feeding its outlet nozzle 7 with one or more reducing elements.

Furthermore, instead of feeding one or more reducing elements to the end of the outlet nozzle 7, it is possible to feed the periphery thereof. In which case, it is possible to use injectors which are fed by the feed module 9 (or by one of its submodules, e.g. 9B) and which are not necessarily secured to the plasma torch 3.

Figure 6:
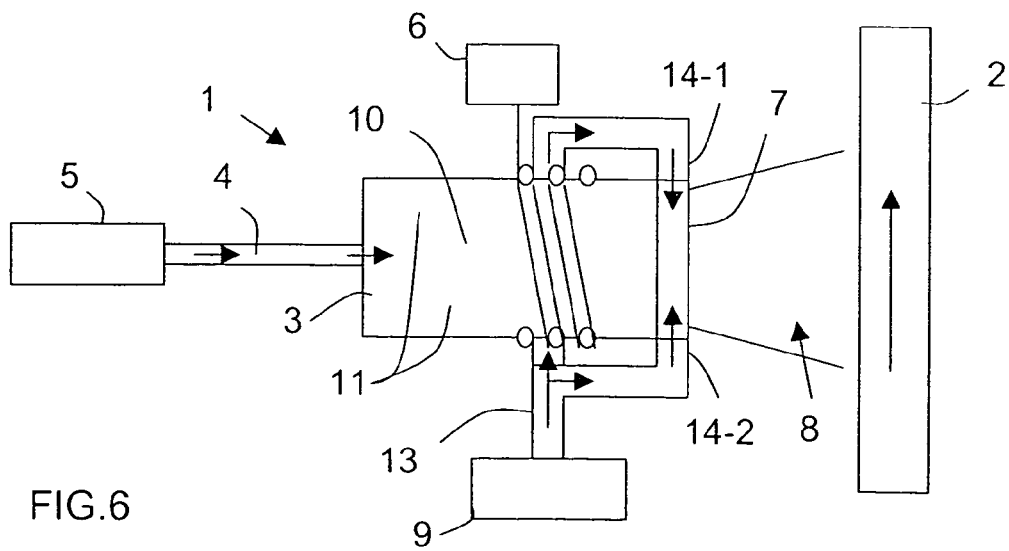
FIG. 6 is a diagram of a fourth embodiment of apparatus of the invention.

Reference is now made to FIG. 6 while describing a fourth embodiment of apparatus of the invention. This apparatus constitutes a variant of the apparatus described above with reference to FIGS. 4 and 5.

In this example, the feed module 9 feeds one or more reducing elements only to the downstream portion of the plasma torch 3 at its outlet nozzle 7 via pipes 13, as in the example of FIG. 4. The outlet nozzle 7 has at least one inlet 14 connected to a pipe 13 and arranged in such a manner as to deliver one or more reducing elements to the outlet of the plasma torch 7, at at least one location.

For example, as shown in FIG. 5, three inlets 14-1 to 14-3 can be provided for introducing the at least one reducing element via at least three locations so as to generate a curtain of one or more reducing elements through which the plasma passes. However it is naturally also possible to provide two inlets or four or even more inlets. Furthermore, the outlet nozzle 7 could be fitted with a multitude of holes providing uniform and distribution diffusion of reducing elements at the outlet end of the plasma torch 3.

The feed module 5 may be used to feed the plasma torch 3 either solely with a plasma-generating gas such as oxygen, nitrogen, or argon, or with a combination of two of them, or else with a gas acting both as a reducing gas and as a plasma-generating gas, such as, for example, hydrogen ($H_2$) and/or ammonia ($NH_3$), preferably accompanied by air.

Figure 7:
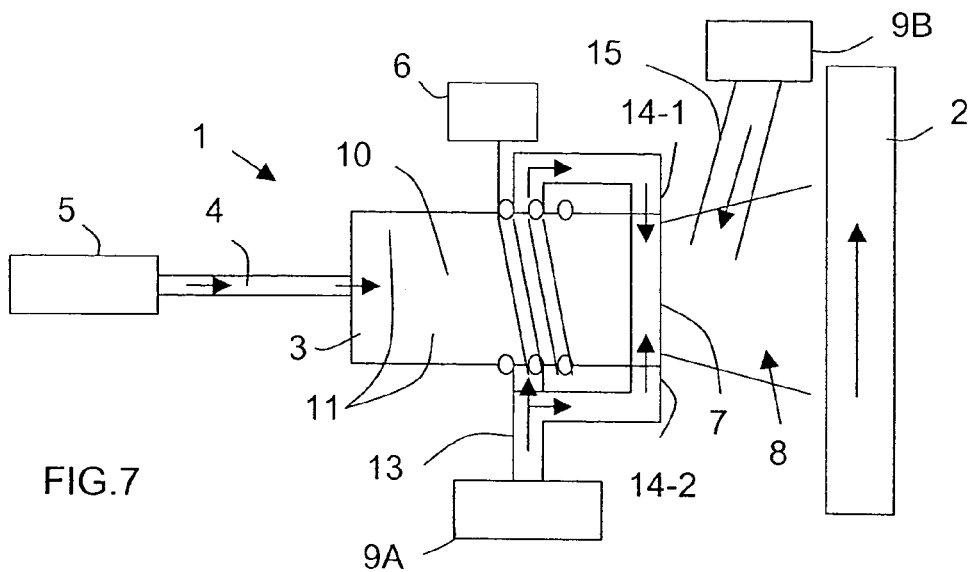
FIG. 7 is a diagram of a fifth embodiment of apparatus of the invention.

Reference is now made to FIG. 7 while describing a fifth embodiment of apparatus of the invention. This embodiment constitutes a variant of the apparatus described above with reference to FIG. 6.

This embodiment starts from the buildup device 1 of FIG. 6 and includes a first feed module 9A which feeds one or more reducing elements to the downstream portion of the plasma torch 3 at its outlet nozzle 7 via pipes 13, and a second feed module 9B which feeds one or more reducing elements to the interaction zone 8 via an injector 15.

In one variant, the injector 15 can be the injector which is used for introducing grains of $SiO_2$.

As in the embodiment of FIG. 6, the feed module 5 may be used to feed the plasma torch 3 either solely with plasma-generating gas, or with a gas that acts simultaneously as a reducing gas and as a plasma-generating gas.

This embodiment is suitable for introducing one or more reducing elements in the solid state or the gaseous state downstream from the torch 3.

Figure 8:
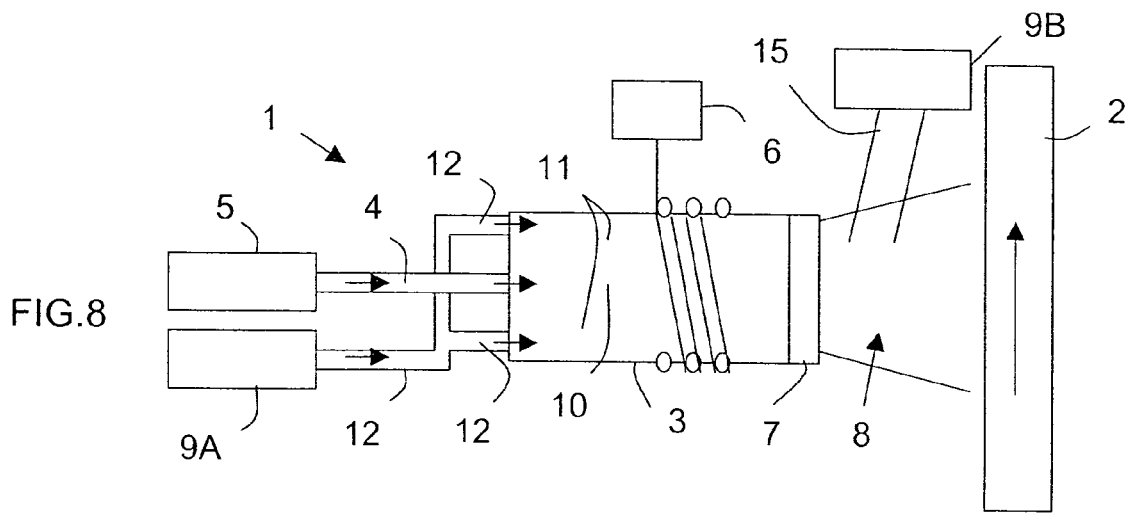
FIG. 8 is a diagram of a sixth embodiment of apparatus of the invention.

Reference is now made to FIG. 8 while describing a sixth embodiment of apparatus of the invention. This apparatus constitutes a variant of the apparatus described above with reference to FIG. 1 or a variant of the apparatus described above with reference to FIG. 7.

In this case, the buildup apparatus 1 has a first feed module 9A which feeds one or more reducing elements to the peripheral zone 11 of the plasma torch 3 via pipes 12, and a second feed module 9B which feeds one or more reducing elements to the interaction zone 8 via an injector 15.

In one variant, the injector 15 may be the injector which is used for introducing grains of $SiO_2$.

This embodiment is adapted to introducing one or more reducing elements in the gaseous state upstream from the torch 3 and one or more reducing elements in the solid or gaseous state downstream from the torch 3.

Figure 9:
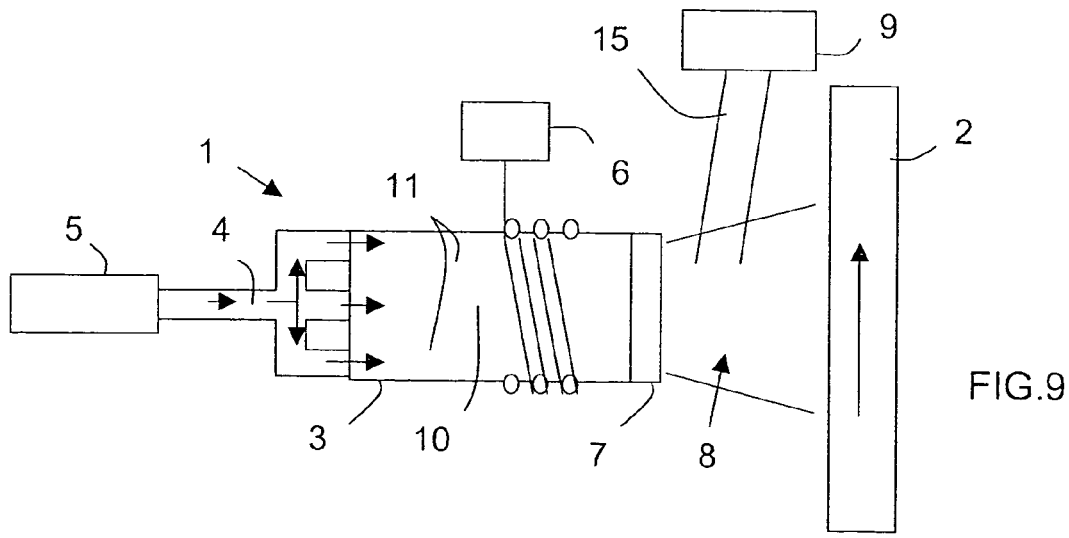
FIG. 9 is a diagram of a seventh embodiment of apparatus of the invention.

Reference is now made to FIG. 9 while describing a seventh embodiment of apparatus of the invention.

In this embodiment, the buildup apparatus 1 includes a feed module 9 which feeds one or more reducing elements to the interaction zone 8 via an injector 15 (which may be the injector that is used for introducing grains of $SiO_2$). Furthermore, as in the example of FIG. 6, the feed module 5 can be used to feed the plasma torch 3 either solely with plasma-generating gas (and air), or else with gas that acts simultaneously as a reducing gas and as a plasma-generating gas.

This embodiment is also adapted to introducing one or more reducing elements in the gaseous state upstream from the torch 3 and one or more reducing elements in the solid state or the gaseous state downstream from the torch 3.

Numerous other variants of the buildup apparatus 1 can be envisaged on the basis of combinations of the various embodiments of the feed modules 5, 9, 9A, and 9B as described above with reference to FIGS. 1 to 9.

The invention also provides a plasma buildup method for building up an optical fiber preform 2.

The method can be implemented using the buildup apparatus 1 and/or the installation as described above. The main and optional functions and subfunctions provided by the steps of the method are substantially identical to those provided by the various means constituting the buildup apparatus 1, so the description below summarizes only those steps that implement the main functions of the method of the invention.

The method consists firstly in depositing buildup material on a primary preform 2 for building up by using a plasma torch 3 fed with plasma-generating gas and in the presence of a silica-based material, and secondly in introducing at least one reducing element upstream from the primary preform 2, the reducing element reacting to induce reduction of the nitrogen oxides produced by interaction between nitrogen and oxygen (contained in the enclosure) in the presence of the plasma generated by the torch.

The invention is not limited to the embodiments of the apparatus and the implementations of the method described above, merely by way of example, but extends to all variants that can be envisaged by the person skilled in the art in the ambit of the following claims.

What is claimed is:

1. A plasma buildup method for building up an optical fiber preform, comprising the following steps:

providing a plasma torch having an outlet nozzle adjacent to a primary preform, wherein an interaction zone is defined between the outlet nozzle and the primary preform;

feeding the plasma torch with a plasma-generating gas in the presence of a silica-based material so as to deposit a buildup material on the primary preform; and introducing a reducing element into the interaction zone, wherein the reducing element reacts to induce reduction of the nitrogen oxides produced by interaction between nitrogen and oxygen in the presence of the plasma generated by the torch, wherein the reducing element is introduced in the gaseous state, and wherein said gaseous reducing element is selected from the group consisting of ammonia and carbon monoxide.

2. A method according to claim 1, further comprising a step of introducing another reducing element into the plasma torch, said other reducing element constituting at least a portion of said plasma-generating gas.

3. A method according to claim 1, further comprising a step of introducing another reducing element into said plasma torch upstream from an outlet nozzle.

4. A method according to claim 3, wherein said other reducing element is introduced into a central zone of the plasma torch in which said plasma-generating gas flows.

5. A method according to claim 4, wherein said other reducing element is introduced into said central zone substantially simultaneously with said plasma-generating gas.

6. A method according to claim 3, wherein said other reducing element is introduced to a periphery of said central zone of the plasma torch.

7. A method according to claim 1, wherein said other reducing element is introduced into said plasma torch at an end of said outlet nozzle.

8. A method according to claim 7, wherein said other reducing element is introduced to a periphery of said end of the outlet nozzle at least one location.

9. A plasma buildup method for building up an optical fiber preform, comprising the following steps:

providing a plasma torch having an outlet nozzle adjacent to a primary preform, wherein an interaction zone is defined between the outlet nozzle and the primary preform;

feeding the plasma torch with a plasma-generating gas in the presence of a silica-based material so as to deposit a buildup material on the primary preform; and introducing a reducing element into the interaction zone, wherein the reducing element reacts to induce reduction of the nitrogen oxides produced by interaction between nitrogen and oxygen in the presence of the plasma generated by the torch, and wherein the reducing element is introduced in a solid state.

10. A method according to claim 9, wherein said solid reducing element is selected from the group consisting of urea, and ammonium fluoride.

* * * * *